Aug. 10, 1926.
P. VOSEN
1,595,176
NUT AND BOLT LOCK
Filed Oct. 1, 1924
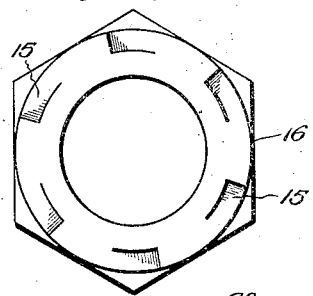
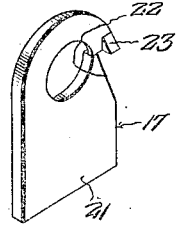
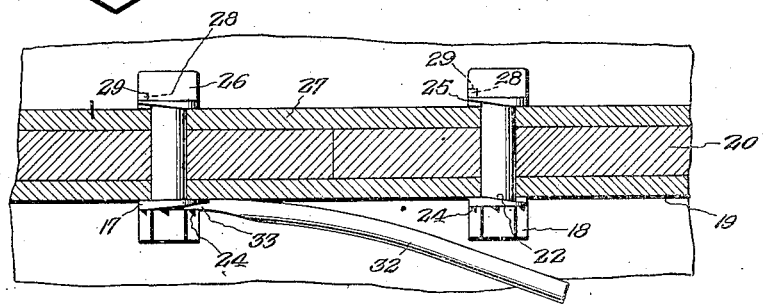
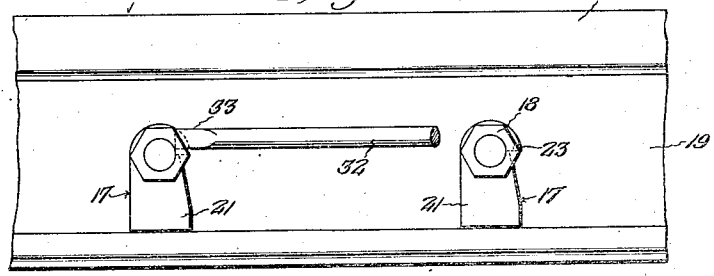
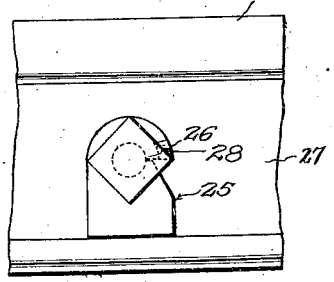
Inventor
Peter Vosen,
Attorney Patented Aug. 10, 1926.

1,595,176

UNITED STATES PATENT OFFICE.

PETER VOSEN, OF FLANDERS, ONTARIO, CANADA.

NUT AND BOLT LOCK.

Application filed October 1, 1924. Serial No. 741,061.

The purpose of the invention is to provide a nut locking means especially adapted for use in connection with nuts on bolts which hold fish plates in engagement with railway rails, in conjunction with means at the head ends of the bolts for locking the bolt, it being obvious that the same key which may be used for unlocking the nut lock may be used for unlocking the bolt lock which is applied adjacent the head of the bolt.

The invention comprises further features and combinations of parts to be hereinafter set forth, shown in the drawings and claimed.

In the drawings:—

Figure 1 is a plan view partly in section of adjoining rails and fish plates with a nut lock applied at one end of the bolt and a bolt lock applied adjacent the head of the bolt, showing a key engaged between the nut lock and the nut for the purpose of unlocking the nut lock.

Figure 2 is a side elevation of the adjoining rails showing one of the fish plates with the nut lock applied, also showing the key.

Figure 3 is a detail perspective view of the nut locking washer or plate shown in Figure 2.

Figure 4 is an elevation of the opposite side of the adjoining rails and a fish plate, showing how the bolt locking washer is held against rotation for the purpose of locking the bolt.

Figure 5 is a detail view showing how the key 32 is used to engage the lug 23 to unlock the washer.

Figure 6 is a detail plan view looking at the face of the nut.

The nut locking washer 17, is interposed between the nut 18 and the fish plate 19 which assists in holding the adjacent ends of two rails 20. However, this locking washer 17 has a rectangular extension 21 which engages with the base of the fish plate, thereby preventing the locking washer 17 from rotating. The locking washer 17 has a beveled portion 22 adjacent the terminal of the spring tongue which also has a beveled lateral lug 23 which engages with the teeth or notches 24 formed on the nut 18. These teeth or notches 24 are of corresponding depth and are not extended fully to the bore of the nut and the opening of the locking washer.

A bolt locking washer 25 is interposed between the head 26 of the bolt and the opposite fish plate 27. This bolt locking washer 25 is similar to the locking washer 17 and the beveled lug 28 at the terminal of the tongue engages depressions or notches 29 in one face of the head of the bolt and since the bolt locking washer 25 also has an extension similar to the extension 21 of the washer 17 and which engages the base of the fish plate to prevent turning of the washer and when the bolt is drawn up tight, it locks itself due to the engagement of the lateral lug with the tooth or notch on the head of the bolt.

A key 32 is provided for unlocking the nut. This key has a reduced end 33 which is V-shaped in cross section, so as to engage between the spring tongue of the nut locking washer and the face of the nut so as to spring the tongue and disengage the lateral beveled lug from engagement with the notches of the nut, whereby the nut may be backed off from the shank of the bolt. It will be noted that the reduced end of the key at one side thereof is of an abrupt V-shape in a direction with the shank of the key, while the opposite portion of the reduced end is of a relatively slight taper or V-shape. In other words, one side of the reduced end of the key is relatively thin while the opposite side is relatively thick in order to permit of a ready insertion of the reduced end of the key between the spring tongue and the face of the nut in the manner shown in the drawings. The key, when inserted in this manner, depresses the spring tongue which will allow the nut to be backed off from the shank of the bolt.

It will be noted that the body of the key is curved as shown, so as to overlie the next or adjacent nut and bolt which fastens the fish plates in position, as illustrated in Figure 1, when the reduced end of the key is placed in position to depress the spring tongue, the relatively thin side of the reduced end is depressed adjacent the shoulder of the notch or tooth on the face of the nut, so that the relatively thick side of the reduced end will act to depress the spring tongue away from the face of the nut.

By the construction shown and described, it is obvious that the bolt and nut which fasten the fish plates and the two adjacent rail ends together are locked positively and are unable to unlock accidentally but by means of the key, the spring tongue may be easily sprung and the nut backed off of the bolt. In this construction, when the bolt is applied, with the bolt locking washer between the head of the bolt and the fish plate, the bolt locks itself when the nut on the other end is rotated home.

The invention having been set forth, what is claimed is:—

A nut and bolt lock washer comprising a plate having a bolt aperture and split to constitute a spring tongue, the tongue being bevelled on one face only and having a bevelled lateral lug of less width than that of the tongue, the edge of the plate below the slit and below the lateral lug being cut away to permit insertion of a bifurcated bevelled tool of the character described.

In testimony whereof he affixes his signature.

PETER VOSEN.